(No Model.)

H. G. CADY & C. L. CULVER.
COTTON PRESS.

No. 267,148. Patented Nov. 7, 1882.

Witnesses:
Phil. C. Dieterich
W. R. Keyworth

Inventors:
H. G. Cady & C. L. Culver
by W. D. Alexander
Attorney.

UNITED STATES PATENT OFFICE.

HENRY G. CADY AND CHARLIE L. CULVER, OF PINE BLUFF, ARKANSAS.

COTTON-PRESS.

SPECIFICATION forming part of Letters Patent No. 267,148, dated November 7, 1882.

Application filed August 22, 1882. (No model.)

*To all whom it may concern:*

Be it known that we, H. G. CADY and C. L. CULVER, of Pine Bluff, in the county of Jefferson and State of Arkansas, have invented certain new and useful Improvements in Cotton-Presses; and we do hereby declare that the following is a full, clear, and exact description thereof, reference being had to the accompanying drawings, and to the letters of reference marked thereon, which form part of this specification, and in which—

Figure 1:
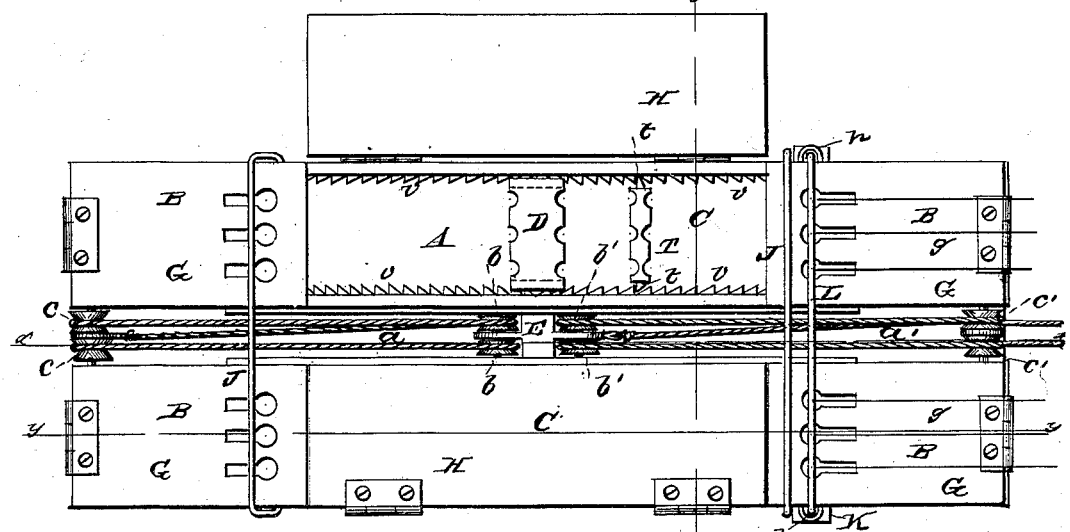
Figure 2:
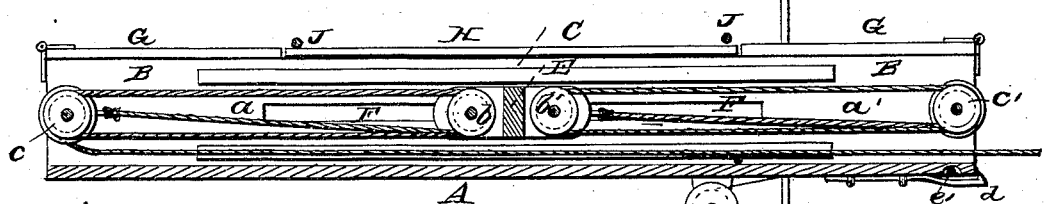
Figure 3:
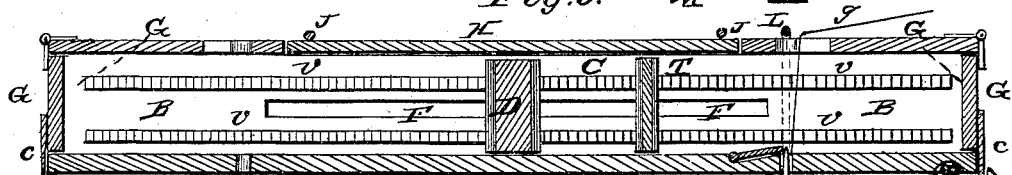
Figures 4, 5:
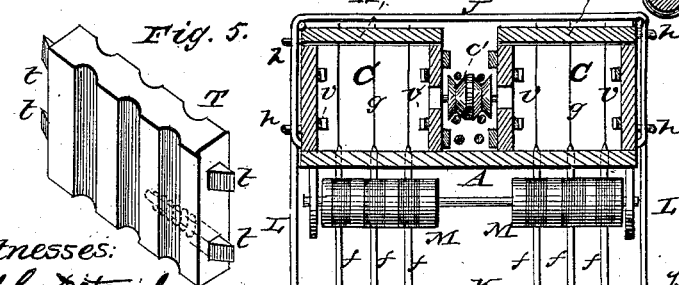

Figure 1 is a top view of the improved press, one of the covers being turned back to expose the follower and the division T. Fig. 2 is a vertical section between the duplex presses. Fig. 3 is a vertical longitudinal section taken in the plane indicated by the dotted line $y\ y$, Fig. 1. Fig. 4 is a vertical cross-section. Fig. 5 is a perspective view of one of the rugated divisions.

This invention relates to novel improvements in presses for baling cotton, hay, and other substances; and the nature of our invention consists in certain novel means for applying the baling-twine about the bales as they are successively pressed, so that the ends of the twine can be readily tied before the pressure on the bales is released; also, in the combination, in a horizontal baling-press having press-boxes arranged on opposite ends of one or more receiving-boxes, of one or more reciprocating double-acting followers or pressing-heads actuated by ropes and pulleys; also, in the combination of retaining gates or stops with a horizontal press box and a reciprocating follower, said gates or stops being so arranged that they will prevent an undue expansion of the compressed mass in the press-boxes during the recession of the follower. These with other features of our invention will be fully understood from the following description when taken in connection with the annexed drawings.

We have represented in the annexed drawings a compound press, and for the purpose of description we shall explain first what we show in Fig. 1, and then more fully set forth the peculiarities of our invention.

A designates the horizontal base of a compound press; B B B B, the press-boxes thereof; and C C, the filling-chambers, in which work followers D D, which are connected together by a transverse bar, E, which passes through and is free to play in slots made through partitions F F. To the transverse bar E, between the slotted partitions, are applied four pulleys, around two of which passes a rope, $a$, and around the other two pulleys the rope $a'$ is passed. The rope $a$ is attached at one end to the bar E and passed around the pulleys $b\ b$ and around pulleys $c\ c$ at one end of the press, and its free end is provided with a hook for attaching it to a horse. The rope $a'$ passes around the pulleys $b'\ b'$ and around pulleys $c'\ c'$ at the opposite end of the press to the pulleys $c\ c$. One end of rope $a'$ is made fast to a swivel on the shaft of pulleys $c'\ c'$, and after passing around its four pulleys the free end is carried out of the same end of the press as the rope $a$, and provided with a hook for attaching it to a horse. By these means the two followers D D can be moved toward either pair of press-boxes B, the horse being hitched first to one rope and then to the other. Each press-box is provided with a hinged door or head, G, which is constructed with a lip, $c$, that is engaged by a spring-catch, $d$, when the door is shut for pressing a bale. The catch $d$ may be depressed to release the free end of the door by means of a cam, $e$, on a rod, $e'$, which has a crank-arm on one end. Other means may be adopted for firmly securing the door G of each one of the press-boxes.

Between the inner ends of the press-boxes B are the filling-chambers, which are of a capacity sufficient to contain the required amount of material to make a bale of the desired size. Each chamber C is provided with a hinged cover, H, which, when it is closed, can be securely held down by means of two pivoted bails, J J, or by other suitable means.

Near the inner end of each press-box are arranged vertically needles $f$, corresponding in number to the number of binding-twines $g$, which are used in baling. The upper ends of these needles $f$ have eyes through them, and the lower ends of the needles are rigidly secured to a horizontal bar, K, arranged beneath the press-box. To the bar K a bail, L, is secured, the vertical limbs of which are guided in eyes $h$ fixed into the sides of the press. The needles are free to play up and down through holes which are made through the top and bottom of each press-box, and through the eyes of the needles are passed the binding-twines g. The binding-twines are wound upon spools M, and carried thence through the needle-holes through the bottom and top of each press-box and over the same, where they are held during the act of pressing a bundle.

The operation of pressing is briefly as follows: The filling-chamber C is packed with a sufficient quantity of material to make a bale, and the cover thereof secured down firmly in place. The horse is then hitched to the proper rope of the tackle above described, and the mass of material is forced from the filling-chamber into the press-box in a compact condition. During this operation the needles will be depressed, but the twines leading from the spools through their eyes will be caused to pass under the bale, around one end, and over the top of the bale. The needles are then forced up, carrying with them the binding-twine, around the inner end of the bale. The ends of the twine are then tied securely, after which the ends of the free twine are drawn over the press-box, and the needles depressed out of the way for pressing another bale. The door or gate of the press-box is now opened and the pressed and bound bale forced out by the pressure of the material against it during the act of pressing another bale. The operations of baling thus described take place alternately at the ends of the press.

While we have shown and described four press-boxes, two being arranged at each end of the press-base in pairs side by side, I do not confine myself to the use of such number for the reason that my binder is applicable to one box as well as to four boxes. It is, however, not only very convenient to employ the arrangement of boxes as shown, but the work of pressing is greatly facilitated, as two bales can be pressed and bound at every stroke of the followers.

T designates a movable partition, which is provided with spring-actuated catches or bolts t on its vertical sides, adapted to engage with racks v on the sides of the filling-chamber of each pair of press-boxes. The teeth of these racks are so pitched that during the pressing of the material the partition will be allowed to move toward a press-box, but will be prevented from backward movement by the recoil of the material when the follower is retracted. We use a number of the partitions T, and apply them between every charge of hay or cotton. They are carried along at each stroke of the follower and pass out of the press box or boxes with the bales. The said movable partitions are grooved, as shown, for allowing the needles to move up and down, and to allow the twine to be passed freely about the bales.

Having described our invention, we claim—

1. The combination of the press-boxes and filling-chambers arranged horizontally on a single base, the vertical longitudinal channel between the same, connected followers D D, the follower-bar E, movable in slots F F, and the system of ropes and pulleys for operating the followers, all combined, arranged, and adapted to operate substantially in the manner and for the purposes described.

2. The combination of the grooved movable partition T, the racks v and spring-latches t, with the filling-chamber, one or more press-boxes, and a reciprocating follower, all constructed and adapted to operate substantially in the manner and for the purposes described.

3. The combination of two press-boxes arranged at opposite ends of two filling-chambers, two followers, a connecting-bar for the same, a vertical longitudinal channel between the press-boxes and filling-chambers, and a system of ropes and pulleys in this channel for actuating the said followers, all constructed and adapted to operate substantially in the manner and for the purposes described.

In testimony that we claim the foregoing as our own we affix our signatures in presence of two witnesses.

HENRY G. CADY.
CHARLIE L. CULVER.

Witnesses:
O. P. SNYDER,
W. B. JACK.